United States Patent [19]

Sano et al.

[11] Patent Number: 4,614,351
[45] Date of Patent: Sep. 30, 1986

[54] STEERING APPARATUS FOR A VEHICLE HAVING STEERABLE FRONT AND REAR WHEELS

[75] Inventors: Shoichi Sano, Tokyo; Yoshimi Furukawa; Yutaka Tashiro, both of Tochigi, all of Japan

[73] Assignee: Honda Giken Kogyo Kabushiki Kaisha, Tokyo, Japan

[21] Appl. No.: 748,672

[22] Filed: Jun. 25, 1985

[30] Foreign Application Priority Data

| Jun. 25, 1984 | [JP] | Japan | 59-130293 |
| Jun. 25, 1984 | [JP] | Japan | 59-130294 |
| Jun. 25, 1984 | [JP] | Japan | 59-130295 |
| Jun. 25, 1984 | [JP] | Japan | 59-130296 |
| Jun. 25, 1984 | [JP] | Japan | 59-130297 |

[51] Int. Cl.$^4$ .............................................. B62D 7/00
[52] U.S. Cl. ........................................... 280/91; 74/50
[58] Field of Search ................... 180/140; 280/91, 99, 280/98, 96; 74/25, 49, 50

[56] References Cited

U.S. PATENT DOCUMENTS

| 3,064,559 | 11/1962 | Treer | 74/49 |
| 3,113,469 | 12/1963 | Muller | 74/50 |
| 4,506,899 | 3/1985 | Sano et al. | 280/91 |
| 4,557,493 | 12/1985 | Sano et al. | 280/91 |

Primary Examiner—John J. Love
Assistant Examiner—Ross Weaver
Attorney, Agent, or Firm—Irving M. Weiner; Joseph P. Carrier; Pamela S. Burt

[57] ABSTRACT

A steering apparatus for a vehicle having steerable front and rear wheels includes a front wheel steering system for steering the front wheels, a rear wheel steering system for steering the rear wheels, a linkage member for coupling the front and rear wheel steering systems to each other. The rear wheel steering system comprises a housing adapted to be mounted on the vehicle, an input shaft angularly movably supported by the housing and having a front end coupled to the connecting means and an eccentric shaft on a rear end thereof, a joint member supported by the housing so as to be movable transversely of the vehicle, a pair of tie rods connected at ends to the joint member and at opposite ends to the rear wheels, and a slide member held in slidable engagement with the joint member and operatively coupled to the eccentric shaft for movement in response to angular movement of the input shaft. The joint member and the slide member are held in tapered engagement with each other to assure desired operation of the steering apparatus for an extended period of time.

16 Claims, 16 Drawing Figures

STEERING APPARATUS FOR A VEHICLE HAVING STEERABLE FRONT AND REAR WHEELS

BACKGROUND OF THE INVENTION

1. Field of the Invention

The present invention relates to an improved steering apparatus for a vehicle having steerable front and rear wheels.

2. Description of Relevant Art

There has been proposed a four-wheel steering apparatus of the so-called symmetric function type in which the maximum steering angles of the rear wheels, when the rear and front wheels are turned in one direction and opposite directions, are equal to each other. Such a four-wheel steering apparatus is disclosed in Japanese Laid-Open Patent Publication No. 58-209657, for example. The disclosed steering apparatus includes a rear wheel steering system having an input shaft rotatable in response to the rotation of a steering wheel, an eccentric shaft mounted on the rear end of the input shaft, a joint member rotatably fitted over the eccentric shaft and interconnecting the respective tie rods of the rear wheels, and a link mechanism by which the joint member is supported on a vehicle chassis for preventing the joint member from swinging.

Another steering apparatus is diclosed in earlier Japanese Laid-Open Patent Publication No. 58-30869. This prior steering apparatus differs from the steering apparatus disclosed in the aforesaid publication in that the eccentric shaft and the joint member are held in slidable engagement with each other to cause the joint member to be moved only in lateral directions.

The steering apparatus of Japanese Laid-Open Patent Publication No. 58-209657 suffers the following drawbacks: Since the link mechanism is employed to prevent the joint member from swinging, a space is required to accommodate such link mechanism, with the result that the steering apparatus cannot be reduced in size. It is difficult to confirm the performance of the steering apparatus before it is installed in the vehicle. It is also difficult to achieve a desired degree of mechanical strength and accuracy of the link mechanism as attached to the vehicle chassis. Since the link mechanism extends laterally toward one chassis side only, the resulting structure is asymmetrical, whereby the ball-and-socket joints by which the tie rods are coupled to the joint member are displaced in slightly different manners when the input shaft is rotated in opposite directions. This has resulted in an error or difference in the angles through which the rear wheels are steered.

Specifically, as the joint member is subject to combined vertical and lateral motions the ball-and-socket joints are also moved vertically causing the rear wheels to be steered through different angles. Finally, the input shaft is supported by a relatively thin holder which is subjected to an intensive force and hence cannot be supported on a resilient rubber mount. Therefore, difficulty has been experienced in insulating noises and vibrations effectively.

In the steering apparatus disclosed in Japanese Laid-Open Publication No. 58-30869, a major drawback results from the fact that the eccentric shaft which is directly fitted in the joint member must necessarily be centered with respect thereto with high accuracy, whereas the presence of a radial clearance is unavoidable between the eccentric shaft and the joint member.

SUMMARY OF THE INVENTION

It is an object of the present invention to provide a steering apparatus for steering front and rear wheels which overcomes the disadvantages of the aforesaid prior-art steering apparatus, i.e., which is compact in overall size, prevents the wheels from being steered through different angles, can be combined with various wheel suspension systems, is capable of automatically centering an eccentric shaft with respect to a joint member, and allows resilient rubber mounts to be employed for effective insulation of noises and vibrations.

According to the present invention, there is provided a steering apparatus for a vehicle having steerable front and rear wheels which includes a front wheel steering system for steering the front wheels, a rear wheel steering system for steering the rear wheels, and a linkage member for coupling the front and rear wheel steering systems to each other. The rear wheel steering system comprises a housing adapted to be mounted on the vehicle, an input shaft angularly movably supported by the housing and having a front end coupled to the coupling means and a rear end coupled to an eccentric shaft, a joint member supported by the housing so as to be movable transversely of the vehicle, a pair of tie rods connected at first ends thereof to the joint member and at opposite ends to the rear wheels, and a slide member held in slidable engagement with the joint member and operatively coupled to the eccentric shaft for movement in response to angular movement of the input shaft. Each of the slide member and the joint member has a pair of slanted surfaces extending substantially vertically and cooperating with each other in constituting, tapered portions. The tapered portion of the joint member and the tapered portion of the slide member being held in engagement with each other to keep the joint member and the slide member in tapered engagement with each other.

The rear wheel steering system includes means for normally urging the input shaft toward the joint member.

The rear wheel steering system further includes an internal gear and a cam member, the internal gear being fixed to the housing in concentric relation to the input shaft. The cam member is angularly movably mounted on the eccentric shaft, and includes a pinion meshing with the internal gear and an eccentric cam engaging the slide member.

The rear wheel steering system also includes rear support means for supporting up the joint member from behind the same.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
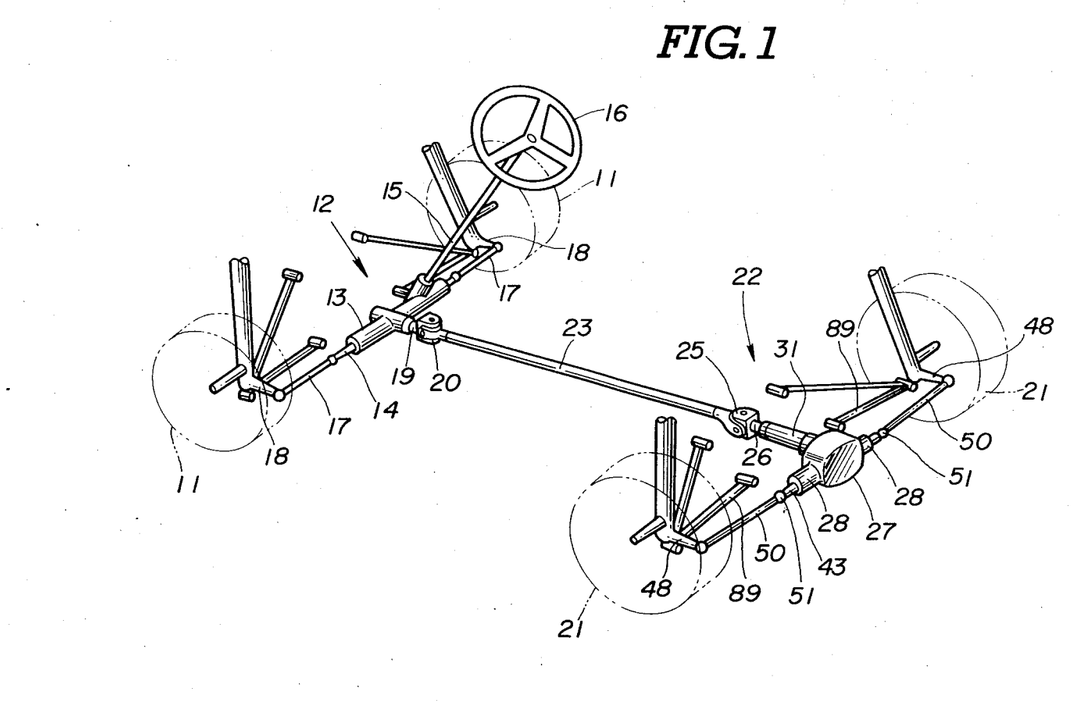
FIG. 1 is a perspective view of a vehicle steering apparatus according to a first embodiment of the present invention.

FIG. 1 shows a steering apparatus according to an embodiment of the present invention, the steering apparatus being incorporated in a motor vehicle having a pair of front wheels 11 and a pair of rear wheels 21 all of which are steerably suspended from a vehicle frame that is omitted from illustration.

The steering apparatus of the invention for steering the front and rear wheels 11, 21 generally comprises a front wheel steering system 12 for steering the front wheels 11, a rear wheel steering system 22 for steering the rear wheels 21, and an elongate linkage shaft 23 operatively interconnecting the front and rear wheel steering systems 12, 22.

The front wheel steering system 12 includes a rack rod 14 disposed in a casing 13 so as to be movable in transverse directions of the motor vehicle. The rack rod 14 has two rows of rack teeth (not shown) held in mesh respectively with a first pinion (not shown) fixed to an end of a steering shaft 15 to which a steering wheel 16 is connected, and a second pinion (not shown) coupled to the linkage shaft 23. The inner ends of tie rods 17 are connected to knuckle arms 18, respectively, by which the front wheels 11 are supported. Therefore, the front wheels 11 can be steered by turning the steering wheel 16 in one direction or the other. The second pinion has a pinion shaft 19 extending rearwardly from the casing 13 and having a rear end coupled by a universal joint 20 to the front end of the linkage shaft 23. The linkage shaft 23 has a rear end coupled by a universal joint 25 to the front end of an input shaft 26 of the rear wheel steering system 22.

Figures 2, 3:
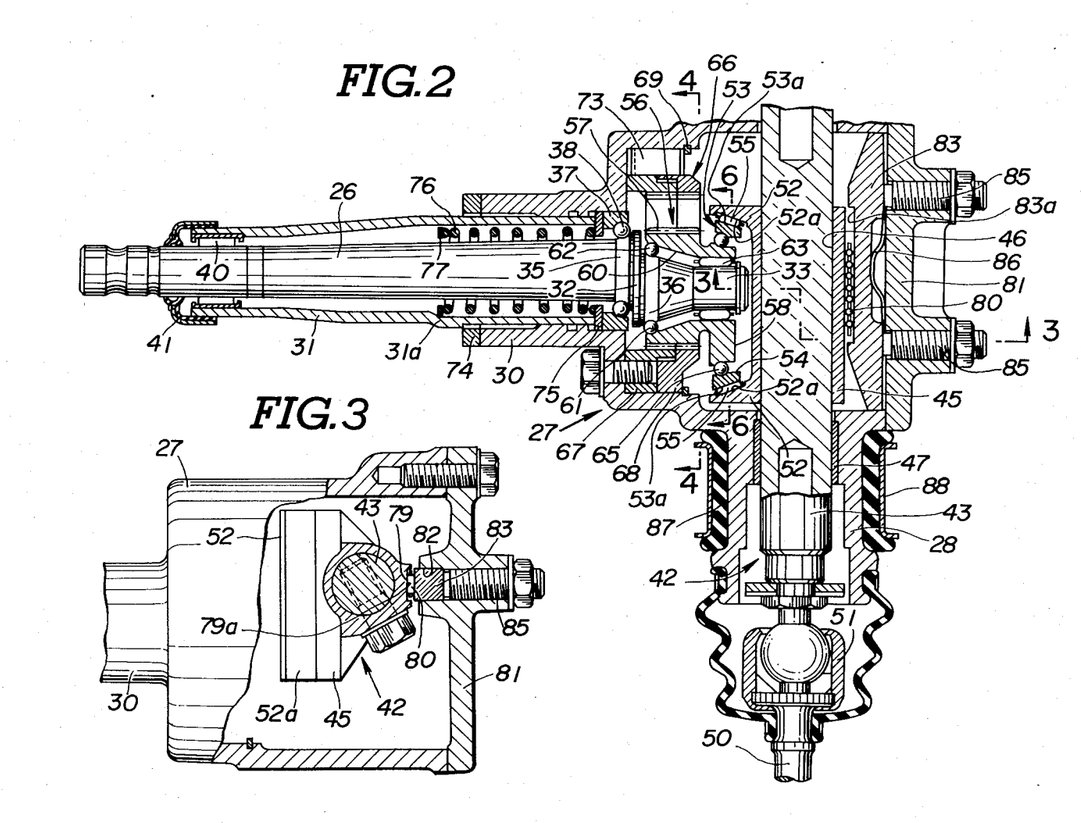
FIG. 2 is a horizontal cross-sectional view of a mechanism in the housing of a rear wheel steering system in the steering apparatus shown in FIG. 1.
FIG. 3 is a partial cross-sectional view taken along line 3—3 of FIG. 2.

The rear wheel steering system 22 includes a box-shaped housing 27. FIG. 2 shows the structure in the housing 27 in detail. The housing 27 includes a pair of integral lateral sleeves 28 projecting away from each other and having axes extending transversely of the vehicle, and an integral central sleeve 30 extending substantially longitudinally of the vehicle. Since the lateral sleeves 28 are symmetrical, only one of them which is located on the lefthand side of the housing 27 is illustrated in FIG. 2. As shown in FIG. 2, a support tube 31 extends through the central sleeve 30 and supports the front end of the input shaft 26 which is mounted in the support tube 31. The input shaft 26 has on its rear end a flange 32 from which an eccentric shaft 33 projects rearwardly, the eccentric shaft 33 having a tapered proximal male end portion. The input shaft 26 has a first annular groove 35 defined adjacent to the flange 32 and serving as the inner race of a first angular contact ball bearing. The eccentric shaft 33 also has a second annular groove 36 defined in the tapered proximal end portion and serving as the inner race of a second angular contact ball bearing. The groove 35 on the input shaft 26, a ring 37 axially movably mounted in the central sleeve 30, and steel balls 38 disposed between the groove 35 and the ring 37 jointly constitute the angular contact bearing by which the rear end of the input shaft 26 is supported. The front end of the input shaft 26 is supported by a roller bearing 40 in the support tube 31. Therefore, the input shaft 26 is rotatably supported on the housing 27. A seal cap 41 is mounted on the front end of the support tube 31 to cover the clearance between the front end of the support tube 31 and the input shaft 26.

A joint member 42 is disposed in the housing 27, the joint member 42 being composed of a joint shaft 43 and an engagement block 45. The engagement block 45 has a transverse horizontal hole 46 defined therethrough, and the joint shaft 43 is inserted through the hole 46. The engagement block 45 is fastened centrally to the joint shaft 43 by means of a bolt. The joint shaft 43 has opposite ends slidably supported by journal bearings 47 in the lateral sleeves 28, respectively, of the housing 27. Consequently, the joint member 42 is supported by the housing 27 for transverse movement with respect to the vehicle. As illustrated in FIG. 1, tie rods 50, which are coupled to knuckle arms 48 on which the rear wheels 21 are supported, are connected by ball-and-socket joints 51 to the opposite ends, respectively, of the joint shaft 43.

As shown in FIGS. 2 and 3, the engagement block 45 has a pair of laterally spaced projections 52 extending forwardly from the front surface of the engagement block 45, each of the projections 52 having a slanted surface 52a oriented in forward and inner directions and extending substantially vertically. The slanted surfaces 52a of the projections 52 cooperate with each other in providing a tapered female portion.

A slide member 53 disposed in the housing 27 in in the form of a substantially square plate having a substantially central hole 54 of a relatively large diameter. The slide member 53 also has slanted surfaces 53a extending substantially vertically and directed in rearward and outward directions from lateral sides thereof, the slanted surfaces 53a cooperating with each other in providing a tapered male portion. The tapered male portion of the slide member 53 is held against the tapered female portion of the joint member 42 through a pair of friction reducer elements 55 so that the slide member 53 is held in tapered sliding engagement with the joint member 42 for vertical relative sliding movement. Each of the friction reducer elements 55 is composed of a row of rollers and a retainer. The inner surface defining the hole 54 in the slide member 53 serves as the outer race of an angular contact ball bearing.

A cam member 56 is fitted over the eccentric shaft 32 and has a pinion 57 with its axis extending longitudinally of the vehicle and a cam 58 disposed behind the pinion 57, the cam member 56 having a hole 60 concentric with the pinion 57. The hole 60 includes a tapered front portion having an annular groove 61 serving as the outer race of the angular contact ball bearing on the eccentric shaft 32. The hole 60 also includes a cylindrical rear surface. The angular contact ball bearing on the eccentric shaft 32 is composed of the annular groove 61 on the cam member 56, the annular groove 36 on the proximal end portion of the eccentric shaft 33, and steel balls 62 disposed in and between the annular grooves 36 and 61. This angular contact ball bearing supports the front end of the cam member 56. The eccentric shaft 33 has a cylindrical distal end portion. Rollers 63 and a retainer are interposed between the cylindrical distal end portion of the eccentric shaft 33 and the cylindrical rear surface of the hole 60 in the cam member 56. These rollers 63 support the rear end of the cam member 56. Thus, the cam member 56 is angularly movably mounted on the eccentric shaft 33. The cam 58 of the cam member 56 is in the form of a disk having an axis parallel to and out of alignment with the axis of the pinion 57. The cam 58 has an outer circumferential surface serving as the inner race of the angular contact ball bearing on the slide member 53. The angular contact ball bearing on the slide member 53 is constructed of the outer circumferential surface of the cam 58, the inner surface of the hole 54 in the slide member 53, and steel balls 65 disposed therebetween. The cam member 56 and the slide member 53 are relatively angularly movable through this angular contact ball bearing. When the cam member 56 turns around the eccentric shaft 33, the cam member 56 functions as an eccentric cam and the slide member 53 functions as a cam follower coacting with the eccentric cam.

The housing 27 accommodates therein an internal gear 66 disposed adjacent to the front wall thereof and held in mesh with the pinion 57 of the cam member 56. The internal gear 66 comprises two front and rear ring gear members 67, 68 superposed one on the other and having identical gear tooth profiles. The front ring gear member 67 has an annular cutout defined in and along the rear outer edge thereof. The rear ring gear member 68 has an annular wall projecting from the front outer edge thereof. The annular wall of the rear ring gear member 68 engages in the annular cutout of the front ring gear member 67. Therefore, the front and rear ring gear members 67, 68 are relatively angularly movable in coaxial relation to each other. The front ring gear member 67 is fastened by a bolt to the front wall of the housing 27. The rear ring gear member 68 is angularly movably diposed in the housing 27, but is rendered axially immovable by a snap ring 69.

Figure 4:
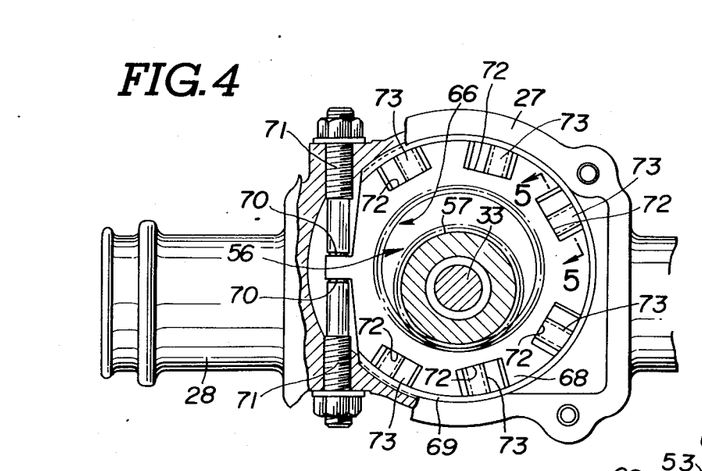
FIG. 4 is a partial cross-sectional view taken along line 4—4 of FIG. 2, showing an internal gear in the rear wheel steering system.
Figure 5:
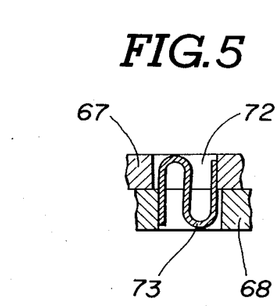
FIG. 5 is a cross-sectional view taken along line 5—5 of FIG. 4, illustrating a notch in the interval gear and a spring disposed in the notch.

As shown in FIGS. 4 and 5, the rear ring gear member 68 has upper and lower steps 70 on one side thereof. Adjustment bolts 71 threaded vertically through the housing 27 are held against the upper and lower steps 70, respectively, for adjustably limiting the angular movement of the rear ring gear member 68. The front and rear ring gear members 67, 68 have a plurality of circumferentially spaced square notches 72 defined in their outer circumferential surfaces, the square notches 72 in the front and rear ring gear members 67, 68 being substantially aligned axially, but slightly displaced relatively to each other. Each pair of the notches 72 contains an S-shaped spring 73 (FIG. 5) having opposite ends engaging edges of the paired notches 72, respectively, for normally urging the angularly movable rear ring gear member 68 in a circumferential direction.

Figure 6:
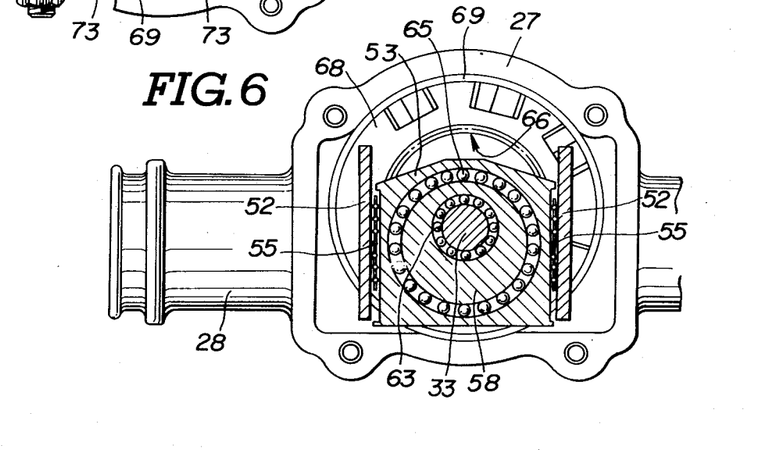
FIG. 6 is a partial cross-sectional view taken along line 6—6 of FIG. 2, showing a slide member and elements held in engagement therewith in the rear wheel steering system.

FIG. 6 shows in cross section the relative positions of the eccentric shaft 33, the cam 58 of the cam member 56, the slide member 53, the projections 52 of the engagement block 52, and the internal gear 66.

The input shaft 26 is associated with a mechanism for adjusting the position of the input shaft 26 in the longitudinal direction thereof. The adjusting mechanism cooperates with the support tube 31 in pushing or urging rearwardly the ring 37 serving as the outer race of the angular contact ball bearing which supports the rear end of the input shaft 26. The adjusting member includes an externally threaded rear outer surface of the support tube 31, and an internally threaded inner surface of the central sleeve 30 of the housing 27, these externally and internally threaded surfaces being held in mesh with each other. Therefore, the support tube 31 can be adjusted in its longitudinal position by turning the support tube 31 in the central sleeve 30. A lock nut 74 is threaded over the externally threaded surface of the support tube 31 for locking the support tube 31 against rotation in the central sleeve 30. The adjusting mechanism also includes a thrust washer held against the front edge surface of the ring 37. The support tube 31 is longitudinally adjusted in position in the central sleeve 30 until the rear end of the support tube 31 abuts against the thrust washer 75. The adjusting mechanism has a coil spring 76 disposed around the input shaft 26 and within the support tube 31, and a spring seat 77 engaging an intermediate step 31a on the inner circumferential surface of the support tube 31. The coil spring 76 is set under compression between the rear surface of the the spring seat 77 and the front surface of the thrust washer 75 for normally urging the ring 37 rearwardly.

Figure 7:
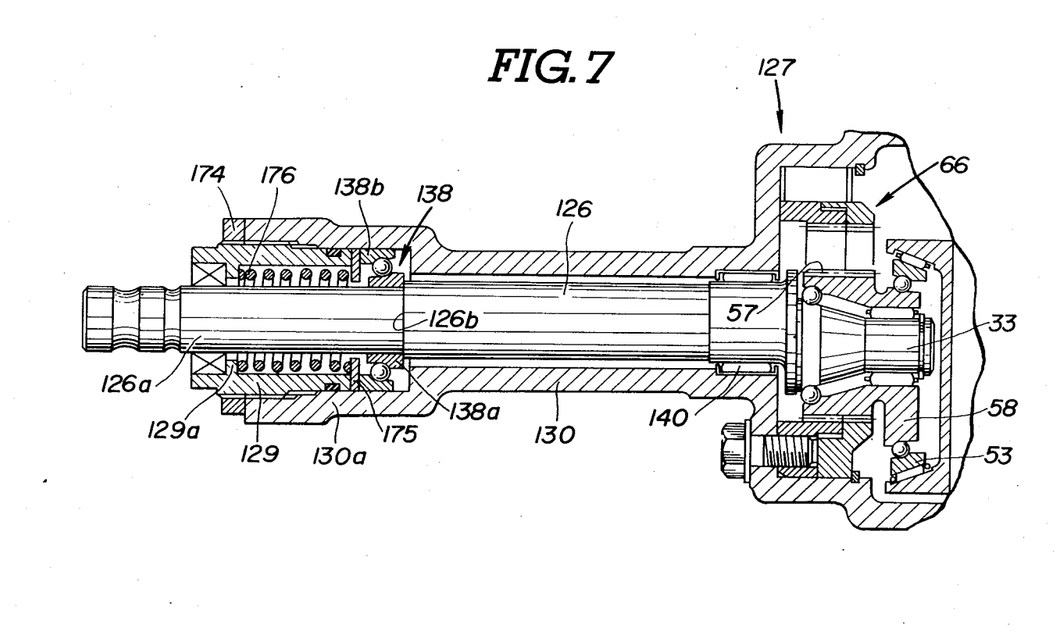
FIG. 7 is a fragmentary cross-sectional view of a modification of the mechanism illustrated in FIG. 2.

The mechanism for adjusting the longitudinal position of the input shaft 26 may be modified as follows: FIG. 7 shows a modified rear wheel steering system having a housing 127 and a support structure for an input shaft 126 which are different from those of the above embodiment. There is no separate support tube for supporting the input shaft 126, but a central sleeve 130 extends forwardly from the housing 127 for supporting the input shaft 126. The central sleeve 130 has an internally threaded inner surface on its front end which is held in mesh with an externally threaded outer surface of a collar 129. The collar 129 can thus be adjusted in its longitudinal position by turning the collar 129 in the central sleeve 130. A lock nut 174 is threaded over the externally threaded outer surface of the collar 129 for locking the collar 129 against rotation in the central sleeve 130. A roller bearing 140 is interposed between the rear end of the input shaft 126 and the central sleeve 130. Adjusting and loading means are disposed between the front end of the input shaft 126 and the central sleeve 130. More specifically, the front end of the input shaft 126 has a smaller-diameter portion 126a with the inner race 138a of an angular contact ball bearing 138 being force-fitted over the smaller-diameter portion 126a against an annular step 126b. The angular contact ball bearing 138 has an outer race 138b disposed axially slidably in a larger-diameter portion 130a on the front end of the central sleeve 130. A thrust washer 175 is held against the front surface of the outer race 138b, and the collar 129 is threaded in the larger-diameter portion 130a until the rear end of the collar 129 is held against the thrust washer 175. A coil spring 176 is interposed between the collar 129 and the input shaft 126 and set under compression between the rear surface of an annular flange 129a projecting radially inwardly from the front portion of the collar 129 and the front surface of the thrust washer 175.

The joint member 42 is subject to the force tending to push it rearwardly, i.e., the force from the spring 76 or 176 of the input shaft position adjusting mechanism. Such force applied to the joint member 42 is effectively borne by a rear support mechanism. As shown in FIGS. 2 and 3, the rear support mechanism includes a wide groove 79 defined in the rear surface of the engagement block 45 and extending transversely in a horizontal direction, the groove 79 having a flat vertical bottom 79a. The housing 27 has a rear wall, which is a detachable housing cover 81, having a groove 82 defined in the front surface thereof and extending transversely in a horizontal direction. A rear support bar 83 accommodated in the groove 82 has a front flat vertical surface 83a lying in confronting relation to the bottom 79a of the groove 79 in the joint member 42. The vertical surface 83a has laterally spaced stoper projections on its opposite ends. The rear support bar 83 is supported by two bolts 85 threaded through the housing cover 81 and held against the rear surface of the rear support bar 83 so that the rear support bar 83 can be positionally adjusted in the longitudinal direction of the vehicle by turning the bolts 85. Friction reducer elements 80 comprising rollers having vertical axes and held by a retainer are interposed between the vertical bottom 79a and the vertical surface 83a. A leaf spring 86 is interposed between the rear support bar 83 and the housing cover 81 for normally urging the rear support bar 83 forwardly.

Part of the rearward force imposed on the joint member 42 is transmitted through the rear support bar 83, the leaf spring 86, and the bolts 85 on the housing cover 81 to the housing 27, and borne by the housing 27. Thereofore, the burden on the journal bearings 47 supporting the opposite ends of the joint shaft 43 can be reduced, and any bending of the joint member 42 under the rearward force can be minimized.

Figure 8:
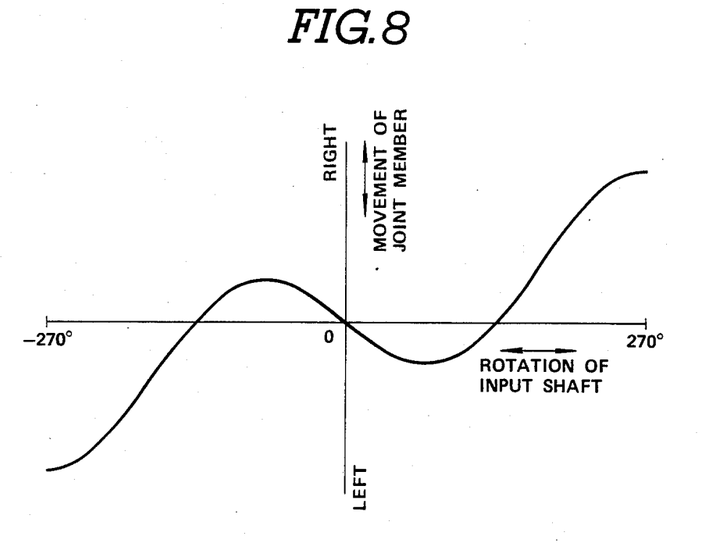
FIG. 8 is a graph indicating the amount of movement of a joint member plotted against the angular displacement of an input shaft in the mechanism of FIG. 2.

When the input shaft 26 and the cam member 56 are to be put into the housing 27, their relative phases or angular positions are selected as follows: At the time the rear wheel steering system is in a neutral or central position as shown in FIGS. 4 and 6, the input shaft 26 is set so that the axis of the eccentric shaft 33 is positioned directly below the axis of the input shaft 26. At such time, the pinion 57 of the cam member 56 meshes with the lowermost teeth of the internal gear 66, and the center of the disk-shaped cam 58 is positioned directly below the axis of the pinion 57. When the front wheels 11 are steered in a righthand direction by the steering wheel 16, the input shaft 26 is turned clockwise (FIG. 6) by the linkage shaft 23 (When the front wheels 11 are steered in a lefthand direction, the input shaft 26 is turned counterclockwise). At the time the front wheels 11 are steered to their limits in the righthand or lefthand direction, the input shaft 26 has been turned through about 270 degrees from its neutral position. As the input shaft 26 rotates, the cam member 56 is caused to rotate about its own axis and also revolve around the axis of the input shaft 26. The slide member 53 is moved upon movement of the center of the disk-shaped cam 58, and the joint member 42 engaging the slide member 53 is moved transversely of the vehicle. The amount of movement of the joint member 42 with respect to the angular displacement of the input shaft 26 is illustrated in FIG. 8. The tie rods 50 and the knuckle arms 48 are arranged such that the rear wheels 21 are steered in a direction opposite to the direction in which the joint member 42 is moved, as shown in FIG. 1. Therefore, when the angular displacement of the steering wheel 16 from its neutral position is relatively small, the front and rear wheels 11, 21 are steered in one direction. However, when the angular displacement of the steering wheel 16 from its neutral position is relatively large, the front and rear wheels 11, 21 are steered in opposite directions. As can be understood from FIG. 8, the maximum angular rotation of input shaft 26 in the range in which the front and rear wheels 11, 21 are steered in opposite directions is larger than the maximum angular rotation of input shaft 26 in the range in which the front and rear wheels 11, 21 are steered in one direction.

The rear wheel steering system 22 can be installed on the vehicle by supporting the housing 27 on the vehicle chassis frame. More specifically, the housing 27 is positioned with the input shaft 26 aligned with the longitudinal central axis of the vehicle chassis, and the sleeves 28 are supported by resilient rubber mounts 87 on respective brackets 88 fixed to the chassis frame.

Figure 9:
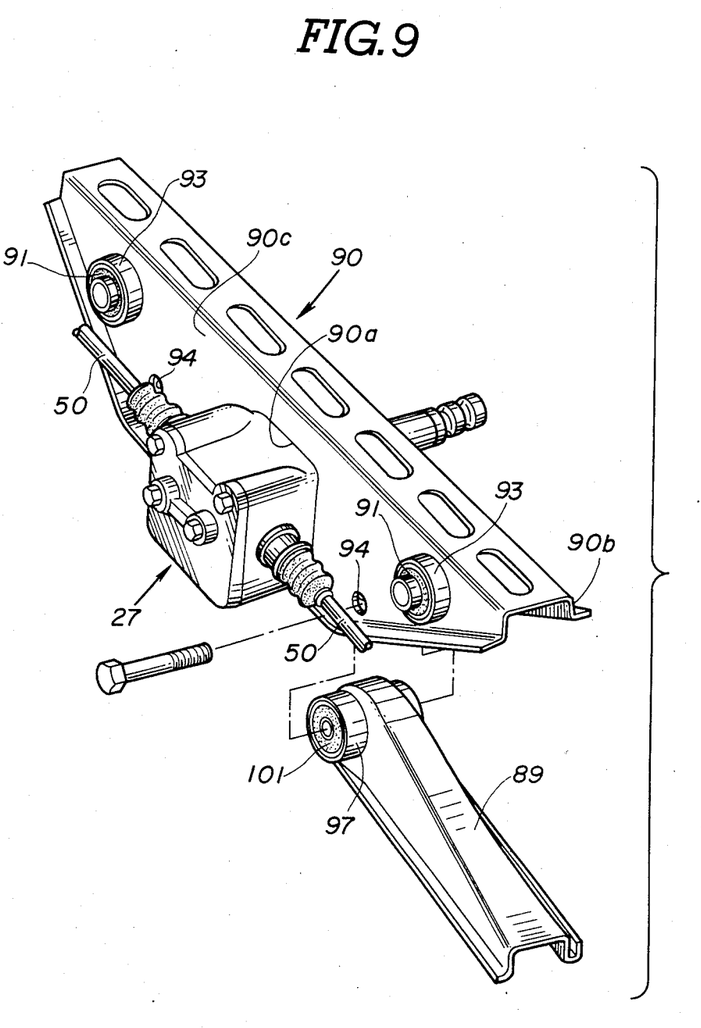
FIG. 9 is an exploded perspective view of a mounting structure for the housing of the rear wheel steering system for the steering apparatus of FIG. 1.
Figure 10:
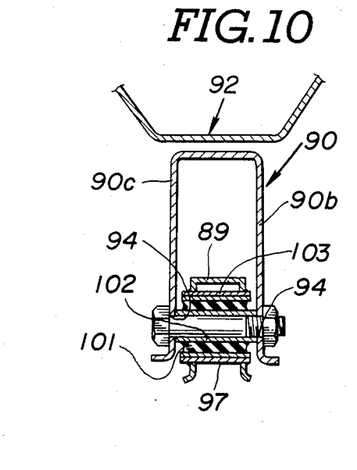
FIGS. 10 through 12 are transverse cross-sectional views of the mount structure of FIG. 9, illustrating the connection between a lower arm and a beam, the connection between the beam and a chassis frame, and the connection between the housing and the beam respectively.
Figure 11:
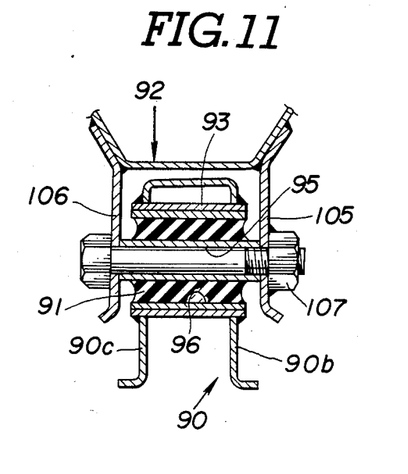
Figure 12:
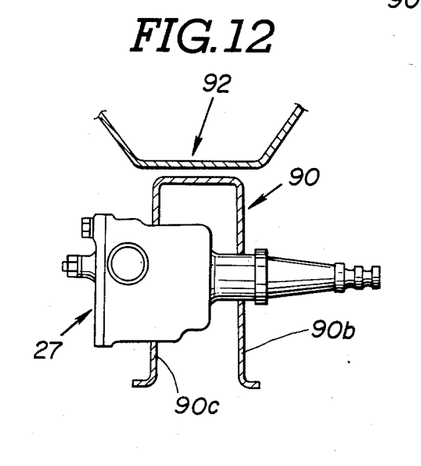
Figure 13:
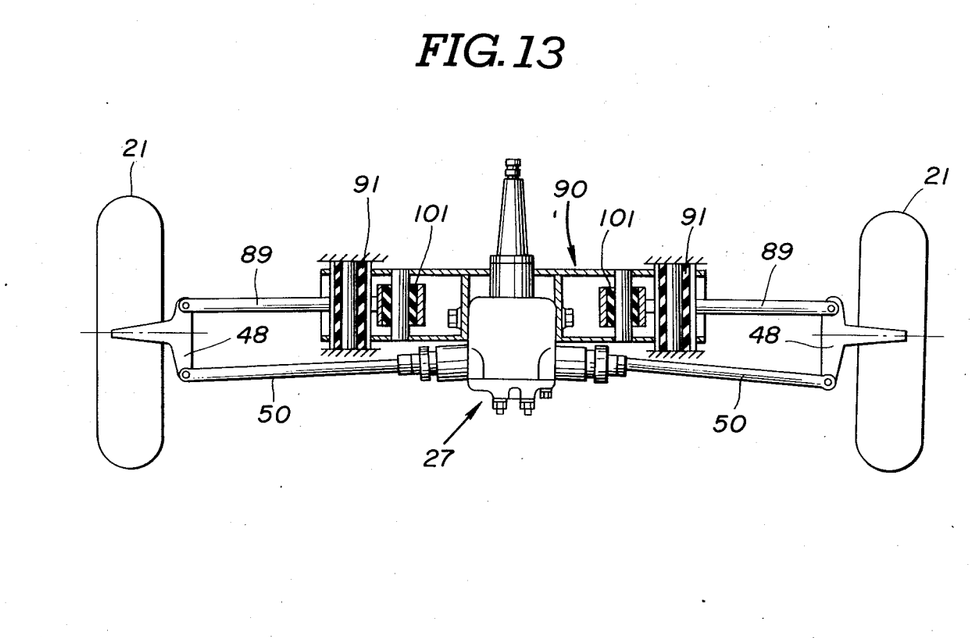
FIG. 13 is a schematic horizontal cross-sectional view of the mounting structure of FIG. 9.

The housing 27 may be installed by another arrangement, which is suitable for a vehicle having a rear suspension system including lower arms 89 as shown in FIG. 1. As illustrated in FIGS. 9 through 13, the housing 27 is fixed to a beam 90 extending horizontally and transversely of the vehicle chassis and supported at its opposite ends to the chassis frame, denoted at 92, by rubber mounts 91. The beam 90 which has a channel-shaped cross section opening downwardly has a housing installation opening 90a in its central portion, collars 93 on its opposite end portions for accommodating the rubber mounts 91 therein, and bolt insertion holes 94 defined below the collars 93 and more closely to the central portion for passage of bolts by which the lower arms 89 can be pivotally mounted on the beam 90. As shown in FIG. 11, each of the rubber mounts 91 is in the form of a hollow cylinder having inner and outer surfaces cured or otherwise fixed respectively to inner and outer sleeves 95, 96. The rubber mount 91 can be attached to each of the opposite end portions of the beam 90 by forcibly fitting the outer sleeve 96 into the collar 93 on the beam 90. Each of the lower arms 89 has a channel-shaped cross section opening downwardly. As illustrated in FIG. 9, a collar 97 is welded to the inner end of the lower arm 89. A hollow cylindrical rubber mount 101 cured or otherwise fixed to inner and outer sleeves 102, 103 (FIG. 10) is attached to the inner end of the lower arm 89 by forcibly inserting the outer sleeve 103 into the collar 97. The inner end of the lower arm 89 is positioned between front and rear flanges 90b, 90c (FIG. 9) of the beam 90. As shown in FIG. 10, a bolt is inserted through the inner sleeve 102 of the rubber mount 101 attached to the lower arm 89 and also through the bolt insertion holes 94 of the beam 90, and then a nut is tightened over the bolt, whereupon the lower arm 89 is pivotally mounted on the beam 90. The chassis frame 92 includes a rear cross frame extending transversely of the chassis and having closely to its opposite ends a pair of front and rear brackets 105, 106 projecting downwardly and having respective through holes. As shown in FIG. 11, the opposite ends of the beam 90 are positioned between the front and rear brackets 105, 106, and bolts are inserted through the holes in the brackets 105, 106 and the inner sleeves 95 of the rubber mounts 91. The bolts are threaded through nuts 107 welded to one of the brackets 105 to thereby mount the beam 90 on the chassis frame 92.

As mentioned above, the housing 27 of the rear wheel steering system is fixed directly to the beam 90, the rear wheel lower arms 89 are coupled to the beam 90 through the rubber mounts 101, and the beam 90 is mounted on the vehicle chassis through the rubber mounts 91. This mounting structure is effective in reducing any forced change in the rear wheel steering angle due to lateral forces applied to the rear wheels 21. More specifically, conventional mounting arrangements have employed a single rubber mount interposed between the inner end of the lower arm and the chassis frame for attenuating road-induced noises transmitted from the wheel through the lower arm to the chassis. As the rubber mount is elastically deformed, the relative positions of the lower arm and the tie rod are varied to change the steering angle. With the foregoing arrangement of the present invention, however, the road-induced noises transmitted can mostly be attenuated by the elastic deformation of the rubber mounts 91 interposed between the beam 90 and the chassis frame 92. Such elastic deformation of the rubber mounts 91 does not affect the relative positions of the lower arms 89 and the tie rods 50. The rubber mounts 101 interposed between the lower arms 89 and the beam 90 are relatively hard, and hence any variation in the aforesaid relative positions is relatively small. Therefore, any forced change in the rear wheel steering angles due to lateral forces applied thereto can be reduced.

A steering apparatus for steering front and rear wheels according to a second embodiment of the present invention will now be described. The steering apparatus of the second embodiment differs from the steering apparatus of the first embodiment shown in FIGS. 1 through 6 as to the housing of the rear wheel steering system and its internal construction. Since the other structural details of the steering apparatus are identical, they will not be described in detail. Furthermore, identical structural details within the housing will also not be described in detail.

Figures 14, 15:
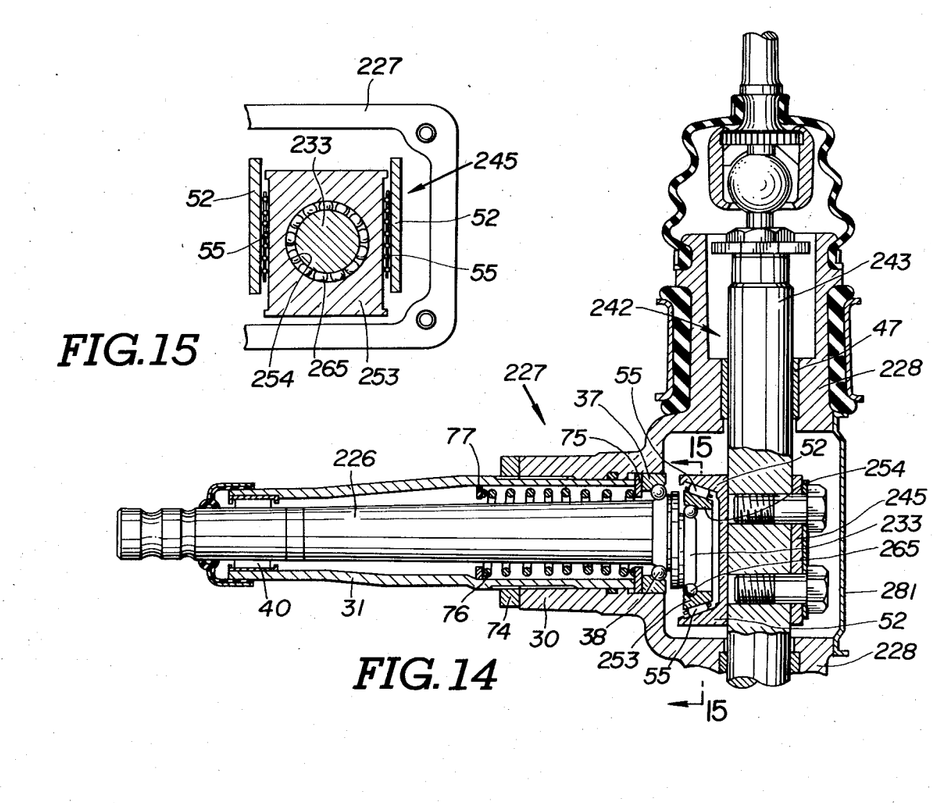
FIG. 14 is a horizontal cross-sectional view of a mechanism in the housing of a rear wheel steering system in a steering apparatus according to a second embodiment of the present invention.
FIG. 15 is a cross-sectional view taken along line 15—15 of FIG. 14, showing a slide member and elements held in engagement therewith in the rear wheel steering system.

FIG. 14 shows the structure in a housing 227 in cross section. The structure in the housing 227 is primarily different from that in the housing 27 of the first embodiment in that the cam member and the internal gear are dispensed with, and an eccentric shaft 233 on the rear end of an input shaft 226 is angularly movably mounted by steel balls 265 in a hole 254 in a slide member 253. The eccentric shaft 233 has on its circumference a groove serving as the inner race of an angular contact ball bearing. This angular contact ball bearing is composed of the groove on the eccentric shaft 233, the steel balls 265, and the inner surface defining the hole 254 in the slide member 253. With no cam member incorporated, the slide member 253 and an engagement block 245 on a joint member 242 which engages the slide member 253 are dimensionally smaller than those of the first embodiment. With no inernal gear employed, the housing 227 is smaller than that of the first embodiment. As a consequence, the distance between laterally spaced sleeves 228 of the housing 227 which support the ends of a joint shaft 243 of the joint member 242 through journal bearings 47 is smaller than that of the first embodiment. Inasmuch as the distance between the journals of the joint shaft 243 is short, and hence the joint shaft 243 is bent to only a small degree under forces applied to the engagement block 245, no rear support mechanism is included for the joint member 242. If required, however, a rear support mechanism similar to the rear support mechanism in the steering apparatus of the first embodiment may be incorporated in the steering apparatus of FIG. 14. As no rear support mechanism is included in the depicted embodiment, a rear housing cover 281 is thinner than the housing cover of the first embodiment, and the rear portion of the engagement block 245 is simpler in construction. The engagement block 245 has a pair of projections 52 extending forwardly from its front surface. The slide member 253 and the engagement block 245 are held in tapered engagement with each other through friction reducer elements 55 in the same manner as that described in the first embodiment. The support tube 31 by which the input shaft 226 is supported, the central sleeve 30 of the housing 227, the coil spring 76, the spring seat 77, the thrust washer 75, and the lock nut 74 of the input shaft position adjusting mechanism are the same as those of the first embodiment. Furthermore, the roller bearing 40 supporting the front end of the input shaft 226, and the ring 37 and the steel balls 38 which support the rear end of the input shaft 226 are also the same as those of the first embodiment.

Figure 16:
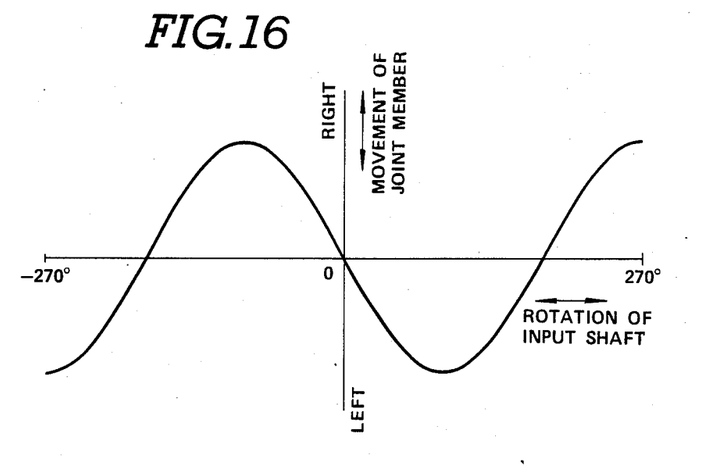
FIG. 16 is a graph indicating the amount of movement of a joint member plotted against the angular displacement of an input shaft in the mechanism of FIG. 14.

When the input shaft 226 is to be put into the housing 27, its phase or angular position is selected as follows: At the time the rear wheel steering system is in a neutral or central position as shown in FIG. 15, the input shaft 226 is set so that the axis of the eccentric shaft 233 is positioned directly below the axis of the input shaft 226. When the front wheels are steered in a righthand direction by the steering wheel, the input shaft 226 is turned clockwise (FIG. 15) (When the front wheels are steered in a lefthand direction, the input shaft 226 is turned counterclockwise). At the time the front wheels are steered to their limits in the righthand or lefthand direction, the input shaft 226 has been turned through about 270 degrees from its neutral position. As the input shaft 226 rotates, the slide member 253 is moved and the joint member 242 engaging the slide member 253 is moved transversely of the vehicle. The amount of movement of the joint member 242 with respect to the angular displacement of the input shaft 226 is illustrated in FIG. 16. When the angular displacement of the steering wheel from its neutral position is relatively small, the front and rear wheels are steered in one direction. However, when the angular displacement of the steering wheel from its neutral position is relatively large, the front and rear wheels are steered in opposite directions. As can be understood from FIG. 16, the maximum angular rotation of input shaft 226 in the range in which the front and rear wheels are steered in opposite directions is equal to the maximum angular rotation of input shaft 226 in the range in which the front and rear wheels are steered in one direction, unlike the steering apparatus of the first embodiment.

In the front and rear wheel steering apparatus according to the present invention, as described above, the slide member mounted on the eccentric shaft of the input shaft in the rear wheel steering system is held in tapered engagement with the joint member coupled to the rear wheel tie rods and horizontally movable transversely of the vehicle. Therefore, the slide member and the joint member can be automatically centered with respect to each other through their tapered engagement. Since the joint member is not caused to swing vertically, the ball-and-socket joints by which the joint shaft is coupled to the rear wheel tie rods are also not caused to swing vertically. The steering angles of the rear wheels are accordingly prevented from suffering an error which would otherwise be caused by vertical swinging movement of the joint shaft and the ball-and-socket joints. The performance of the rear wheel steering system can be confirmed prior to installation thereof onto the vehicle, inasmuch as no link mechanism is required in the rear wheel steering system. This design feature along with the fact that the eccentric shaft of the input shaft can be extremely short according to the present invention, always the rear wheel steering system to be compact in size and symmetrical in shape.

Also, according to the present invention the joint shaft may be selected to have different lengths, dependent on the suspension system used, and there is no limitation on the positions of the ball-and-socket joints.

The sleeves of the housing are spaced widely for supporting the housing on the vehicle chassis, and hence the sleeves can be supported by resilient rubber mounts while assuring a high rigidity for effectively insulating noises and vibrations.

According to the foregoing embodiments, the support tube for the input shaft is longitudinally adjustable in position in the central sleeve of the housing, and the input shaft is also positionally adjustable through the thrust washer and the angular contact ball bearing on the rear end of the input shaft upon positional adjustment of the support tube. The result of this discussed arrangement is that the manner in which the components are held in engagement with each other can be adjusted.

The input shaft is urged rearwardly by the spring through the thrust washer and the angular contact ball bearing. This can prevent the slide member and the joint member from being subject to a backlash in their tapered engagement. Thus, the slide member and the joint member can be held in stable engagement for a prolonged period of time. More specifically, any clearance in all of the angular contact ball bearings of the rear wheel steering system and between the slide member and the joint member is eliminated in both radial and thrust directions under the force of the spring. Consequently, the components are prevented from suffering backlashes and desired steering angles can be accurately assured.

In the first discussed embodiment of the present invention as depicted in FIG. 2, the rear support means is disposed behind the central portion of the joint member 42, i.e., the rear support bar 83 is positioned rearwardly of the center of the joint member 42, with the rollers 60 interposed between the rear support bar 83 and the joint member 42, and the joint member 42 is urged forwardly under the resiliency of the leaf spring 86. The joint shaft 43 urged by the spring 76 is prevented by the rear support means from unduly flexing rearwardly. Sliding friction between the joint shaft 43 and the journal bearings 47 can also be reduced by the rear support means for improved response of the rear wheels to steering action. The distance or span between the journal bearings 47 supporting the joint shaft 43 can be increased, and wear on the journal bearings 47 can be thereby reduced.

The internal gear 66 with which the pinion 57 of the cam member 56 is in mesh for revolution is composed of the nonrotatably ring gear member 67 and the angularly movable ring gear member 68 which is loaded by the S-shaped springs 73 to turn. The teeth of the pinion 57 can be held in stable mesh with the teeth of the ring gear members 67, 68 under the resilient forces of the S-shaped springs 73 wherever the pinion 57 may mesh with the internal gear 66. Therefore, the meshing engagement of the pinion 57 with the internal gear 66 is automatically rendered free from any backlash at all times, thus achieving a silent gear meshing arrangement. By turning the adjustment bolts 71 for adjusting the angular position of the ring gear member 68, the loading forces produced by the S-shaped springs 73 can be adjusted slightly for reliable prevention of unwanted gear backlashes fully around the internal gear 66.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

What is claimed is:

1. A steering apparatus for a vehicle having steerable front and rear wheels, comprising:
   (a) front wheel steering system for steering the front wheels;
   (b) a rear wheel steering system for steering the rear wheels;
   (c) linkage means for coupling said front and rear wheel steering systems to each other; and
   (d) said rear wheel steering system comprising:
      (i) a housing adapted to be mounted on the vehicle;
      (ii) an input shaft angularly movably supported by said housing and having a front end coupled to said linkage means and an eccentric shaft on a rear end thereof;
      (iii) a joint member supported by said housing so as to be movable transversely of the vehicle, said joint member having a pair of slanted surfaces extending substantially vertically and cooperating with each other in constituting a tapered portion;
      (iv) a pair of tie rods connected at first ends to said joint member and at opposite ends to the rear wheels; and
      (v) a slide member held in slidable engagement with said joint member and operatively coupled to said eccentric shaft for movement in response to angular movement of said input shaft, said slide member having a pair of slanted surfaces extending substantially vertically and cooperating with each other in constituting a tapered portion, said tapered portion of said joint member and said tapered portion of said slide member being held in engagement with each other to keep said joint member and said slide member in tapered engagement with each other.

2. A steering apparatus according to claim 1, wherein said rear wheel steering system has an internal gear and a cam member, said internal gear being fixed to said housing in concentric relation to said input shaft, said cam member being angularly movably mounted on said eccentric shaft and having a pinion meshing with said internal gear and an eccentric cam engaging said slide member.

3. A steering apparatus according to claim 2, wherein said internal gear comprises two gear members superposed one on the other, one of said gear members being fixed to said housing, the other gear member being angularly movably attached to said housing, said internal gear having means for urging said other gear member to move angularly.

4. A steering apparatus according to claim 3, wherein said internal gear has means for adjustably limiting the angular movement of said other gear member.

5. A steering apparatus according to claim 1, wherein said rear wheel steering system has means for normally urging said input shaft toward said joint member.

6. A steering apparatus according to claim 5, wherein said rear wheel steering system has means for adjusting said input shaft in its longitudinal position.

7. A steering apparatus according to claim 6, wherein said adjusting means comprises a support tube attached to said housing and adjustable in its longitudinal position, said input shaft being supported in said support tube, an angular contact ball bearing by which said rear end of said input shaft is supported in said housing, and a thrust washer interposed between said support tube and said angular contact ball bearing.

8. A steering apparatus according to claim 6, wherein said urging means comprises a coil spring disposed in said support tube for normally urging said thrust washer rearwardly toward said joint member.

9. A steering apparatus according to claim 2, wherein said rear wheel steering system has means for normally urging said input shaft toward said joint member.

10. A steering apparatus according to claim 9, wherein said rear wheel steering system has means for adjusting said input shaft in its longitudinal position.

11. A steering apparatus according to claim 10, wherein said adjusting means comprises a support tube attached to said housing and adjustable in its longitudinal position, said input shaft being supported in said support tube, an angular contact ball bearing by which said rear end of said input shaft is supported in said housing, and a thrust washer interposed between said support tube and said angular contact ball bearing.

12. A steering apparatus according to claim 11, wherein said urging means comprises a coil spring disposed in said support tube for normally urging said thrust washer rearwardly toward said joint member.

13. A steering apparatus according to claim 9, wherein said rear wheel steering system has rear support means for supporting said joint member from behind the same.

14. A steering apparatus according to claim 13, wherein said rear support means comprises a rear support bar supported on said housing and held against a rear portion of said joint member through friction reducer elements, and adjustment bolts attached to said housing for positionally adjusting said rear support bar longitudinally of the vehicle.

15. A steering apparatus according to claim 1, wherein said housing is mounted by a beam on said vehicle, said beam being directly fixed to said housing and mounted on said vehicle through rubber mounts, said vehicle having a rear wheel suspension system including lower arms with inner ends thereof coupled through rubber mounts to said beam.

16. A steering apparatus according to claim 2, wherein said housing is mounted by a beam on said vehicle, said beam being directly fixed to said housing and mounted on said vehicle through rubber mounts, said vehicle having a rear wheel suspension system including lower arms with inner ends thereof coupled through rubber mounts to said beam.

* * * * *

UNITED STATES PATENT AND TRADEMARK OFFICE
CERTIFICATE OF CORRECTION

PATENT NO. : 4,614,351
DATED : September 30, 1986
INVENTOR(S) : Shoichi SANO et al It is certified that error appears in the above-identified patent and that said Letters Patent are hereby corrected as shown below:

Column 2, line 36, change the comma to --respective--;
          line 52, delete "up".
Column 3, line 62, after "17" insert --are coupled to the opposite ends of rack rod 14, while the outer ends of the tie rods 17--.
Column 4, line 62, after "27" delete "in"  (second occurrence)
Column 6, line 45, delete "the" (first occurrence).
Column 7, line 49, correct the spelling of --Therefore--.
Column 11, line 21, change "always" to --allows--.
Column 12, line 36, after "(a)" insert --a--.

Signed and Sealed this

Fourteenth Day of April, 1987

Attest:

DONALD J. QUIGG

Attesting Officer

Commissioner of Patents and Trademarks